United States Patent [19]

Ferrar et al.

[11] Patent Number: 4,583,862
[45] Date of Patent: Apr. 22, 1986

[54] OPTICAL POSITION AND ORIENTATION SENSING SYSTEMS

[75] Inventors: Carl M. Ferrar, East Hartford; Robert Zincone, Norwalk, both of Conn.

[73] Assignee: United Technologies Corporation, Hartford, Conn.

[21] Appl. No.: 562,622

[22] Filed: Dec. 19, 1983

[51] Int. Cl.[4] ............... G01B 11/26; G01M 1/00
[52] U.S. Cl. ........................ 356/152; 73/455
[58] Field of Search ............... 356/152, 1; 73/455, 73/178 H; 340/946

[56] References Cited

U.S. PATENT DOCUMENTS 2,806,402  9/1957  Ferris ............................ 356/152
3,386,031  5/1968  Able et al. ...................... 73/455
3,690,767  9/1972  Missio et al. .................... 356/5
4,534,650  8/1985  Clerget et al. ................... 356/1

Primary Examiner—Stephen C. Buczinski
Assistant Examiner—Linda J. Wallace
Attorney, Agent, or Firm—M. P. Williams

[57] ABSTRACT

Orientation and/or position of a first body, such as the inboard end 42 of a helicopter blade 21, with respect to a second body, such as a rotor hub arm 36, is sensed by determining the position of the images 93, 95-97, of light from sources 80, 81 passed through slits 89, 90 on detector arrays 91, 92. Signal processing means (FIG. 5, FIG. 11) provide signals indicative of such image positions, which can be used to determine, from simple trigonometry, the orientation and/or position of the first body.

3 Claims, 13 Drawing Figures

FIG. 7
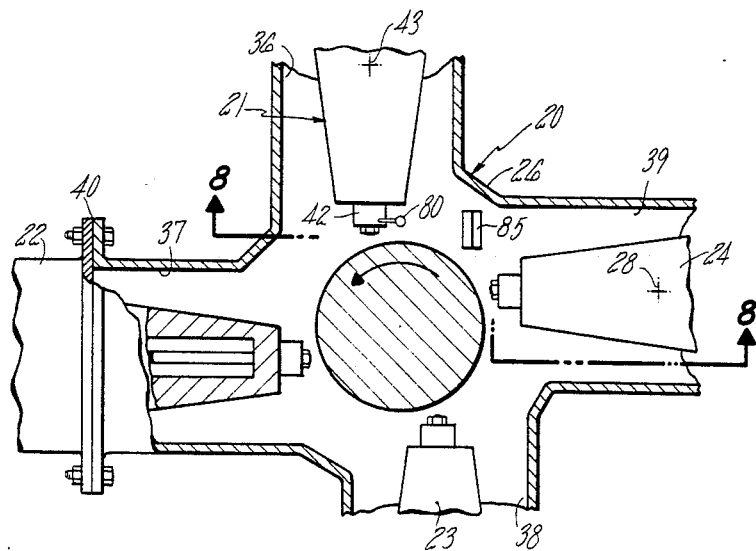
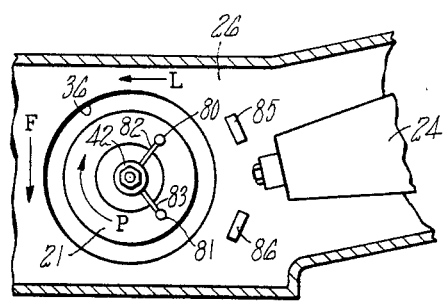
FIG. 8

OPTICAL POSITION AND ORIENTATION SENSING SYSTEMS

DESCRIPTION

1. Technical Field

This invention relates to sensing the position and orientation of objects, and more particularly to optical position and orientation sensing systems capable of implementation in a wide variety of environments having limiting constraints.

2. Background Art

An example of a difficult environment in which to sense the position and/or orientation of an object is the rotor head of a helicopter main rotor. For various experimental, test and other purposes, it is desirable to be able to measure instantaneous values of main rotor blade flap angle, lag angle and/or pitch angle. These angles are manifested within the rotor head by spatial movement or rotation of the inboard blade end. In the past, it has been common to use mechanically actuated potentiometers, each mounted in such a fashion as to respond to a particular one of the angles which are to be monitored. However, there is frequently inadequate space to provide the necessary mechanical linkage, and such mechanical linkage may become quite complex. Additionally, such devices exhibit short life due to mechanical wear. Further, the signals provided by such devices are frequently too noisy to be of practical value, depending on the utilization thereof. Factors that further complicate such measurements include mounting of blades in a fashion offset from the rotary axis of the rotor, and variations in blade hubs, blade spindles and other characteristics of the inboard end of the blades. There are other disciplines and environments which provide similar measurement problems.

DISCLOSURE OF INVENTION

Objects of the invention include provision of position and orientation sensing systems capable of being implemented in a variety of configurations and within a variety of environments, and provision of improved optical position and orientation sensing systems. Another object of the invention is provision of improved means for sensing blade angles in a helicopter main rotor.

According to the invention, an optical source is mounted on a moving member in proximity with a pair of optical sensors, each optical sensor comprising an opaque light barrier having an optical slit therein with a plurality of photodetectors disposed in an array on the side of the optical barrier opposite to the source, such that the angle between the source and the array is uniquely identified by the photodetectors which are illuminated by the source through the slit of the sensor. In one embodiment of the invention, two such sets of a source and a pair of sensors are utilized to provide positional and rotational information of the moving body. In accordance with the invention still further, a pair of sources are mounted on a moving body in proximity with a pair of such sensors, the relationship between the two sources and the two sensors being such that the images on the sensor arrays from the two sources always appear in the same relative order along the arrays and therefore can be unambiguously identified by the response of the individual elements in the array to the light impinging thereon.

In accordance with a particular embodiment of the invention, lead angle and lag angle of a helicopter rotor blade are sensed by a system employing a light source disposed on the inboard end of the blade and a pair of such detector arrays disposed within the rotor head. In accordance with another specific embodiment of the invention, helicopter blade lead angle, lag angle and pitch angle are sensed by a pair of light sources and at least two such sensor arrays.

The invention, although originated for use in a helicopter, may find a wide variety of applications for detecting position and/or orientation of moving objects, particularly where more traditional instrumentation is unsuited.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 7 is a simplified, partially sectioned plan view of a helicopter rotor of the type illustrated in FIG. 1;

FIG. 8 is a simplified, partially sectioned side elevation view of a helicopter rotor, taken on the line 8—8 in FIG. 7;

BEST MODE FOR CARRYING OUT THE INVENTION

Figure 1:
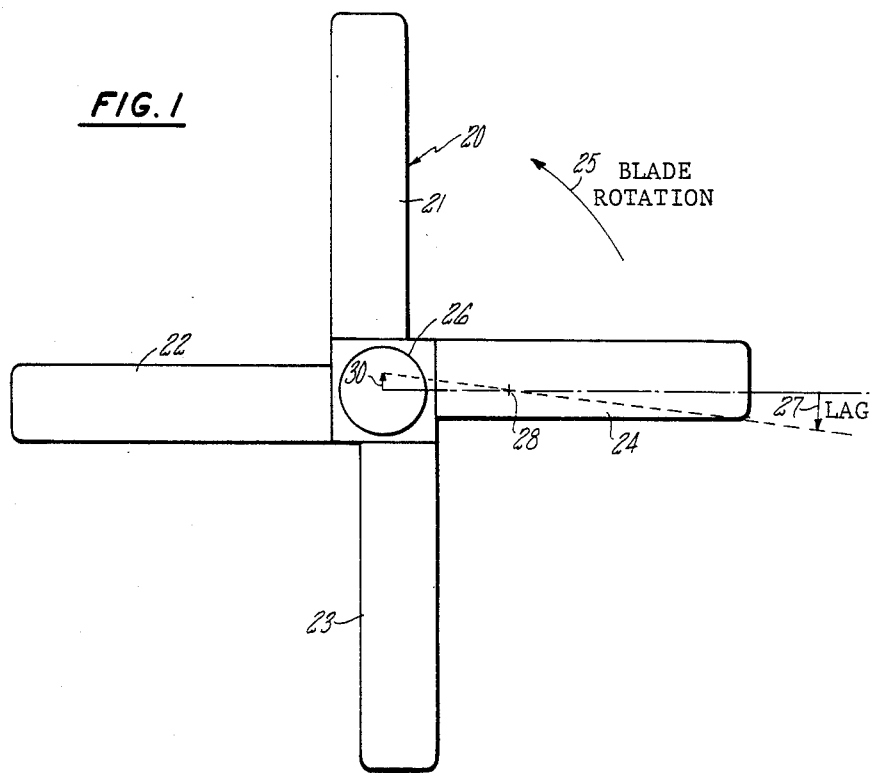
FIG. 1 is a simplified plan view of a helicopter main rotor illustrating lag angle.
Figure 2:
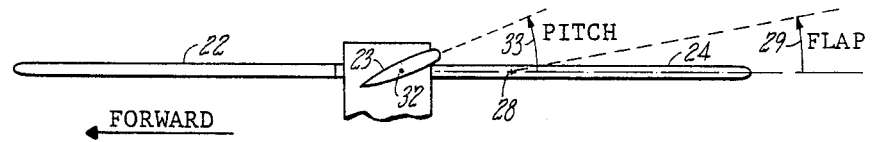
FIG. 2 is a simplified side elevation view of a helicopter main rotor illustrating flap angle and pitch angle.

Referring now to FIG. 1, a helicopter rotor 20 including a plurality of blades 21–24 typically rotates in a counterclockwise direction as illustrated by an arrow 25. The blades 21–24 are typically mounted in an offset fashion with respect to the axis of rotation and the rotor hub 26. One of the parameters which is desired to be known in helicopter blades is the lag angle illustrated by arrow 27, which results from resistance of the blade by the atmosphere as the blade tries to advance therethrough in the direction shown. The articulated mounting of the blade with respect to the rotor head 26 is such that there is a pivot point 28 a very short distance along the blade, whereby lag angle illustrated by arrow 27 also causes an opposite angle at the inboard end of the blade, as illustrated by an arrow 30. Thus it is possible to measure lag angle by virtue of the motion illustrated by the arrow 30, within the rotor head. Referring to FIG. 2, another parameter which is desired to be measured is flap angle, illustrated by the arrow 29, which results from loading on the blade (vertical lift). Another parameter which is desired to be measured is the angle of pitch of the blade (such as blade 23) about its axis 32, as illustrated by the arrow 33.

FIG. 7 is a broken-away plan view (similar to FIG. 1) looking down on the ends of the blades 21-24. Each blade end is disposed within a corresponding hub arm 36-39 to which the blades are mounted, as at 40. FIG. 8 is a partial side elevation view looking directly at the end 42 of the blade 21 within its hub arm 36. In the various embodiments herein, blade 21 is used as an example as the motion of its end 42 about its pivot 43 (FIG. 7) is sensed optically.

Figure 4:
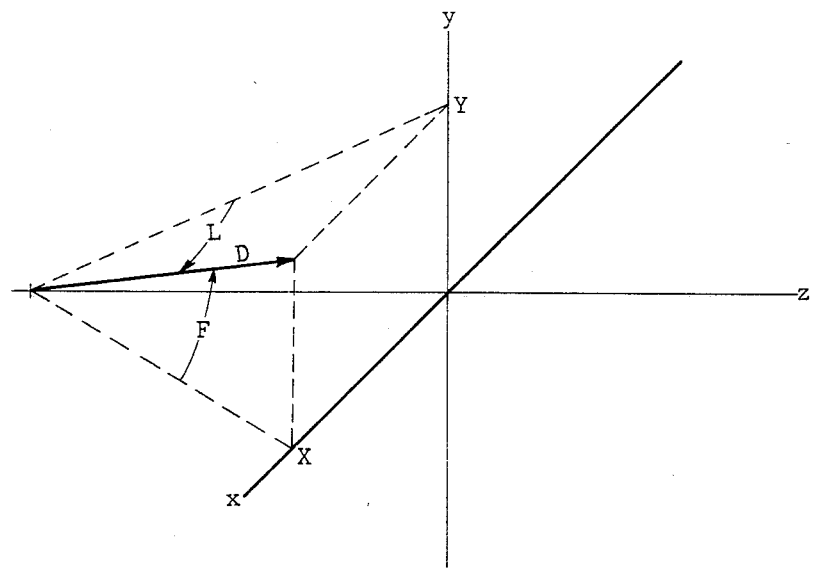
FIG. 4 is a schematic illustration of trigonometric relationships of the sensor system of FIG. 3.
Figure 3:
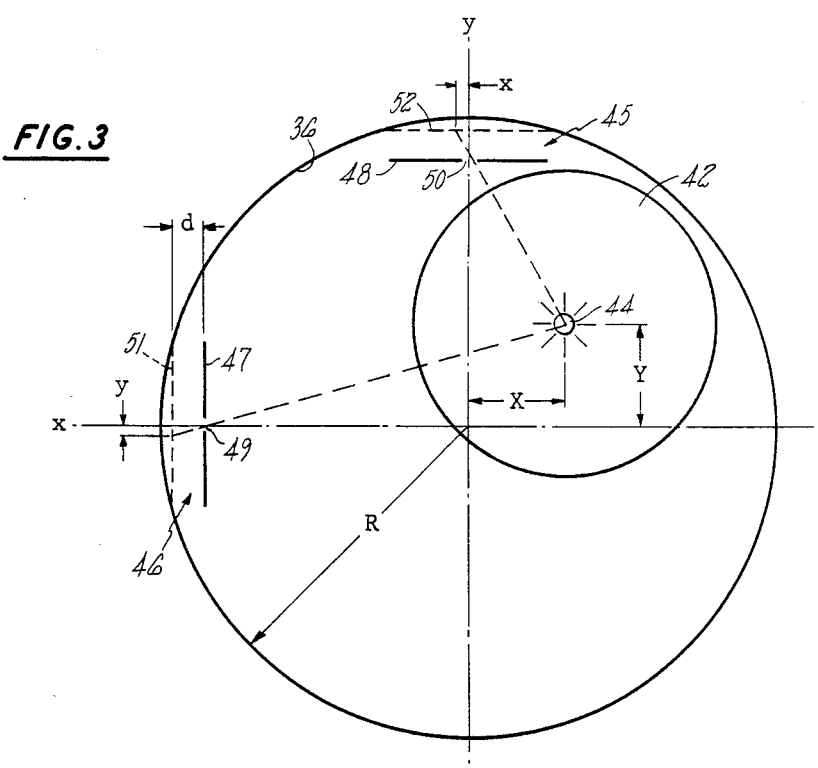
FIG. 3 is a simplified illustration of a sensor system in accordance with the invention utilizing one light source disposed on the inboard end of helicopter blade and two detector arrays disposed adjacent thereto on the blade hub, and geometric relationships therein.

Referring now to FIG. 3, in a simple embodiment of the invention, the blade end 42 is shown offset within the hub 36 as an example of significant flap angle and lag angle simultaneously. In the simplest embodiment, a single light source 44 is simply mounted at the center of the blade end 42. A pair of sensors 45, 46 are disposed at 90° angles to each other. Each of the sensors 45, 46 comprises an opaque light shield 47, 48 having an optical slit 49, 50 therein. Disposed on the opposite sides of each of the shields 47, 48 from the source 44 is an optical detector array 51, 52. Each array may be an EGG Reticon RL-1024-G, having 1024 optical elements disposed in a single row on the order of 25 millimeters long, thereby providing about 25 micron element-to-element resolution. As seen in FIG. 3, the position of the source 44 will determine where its image is located on the arrays 51, 52. For the sensor 45, the amount, x, by which the image is centered off the y axis is indicative of the amount, x, by which the light source 44 is displaced from the y axis. Similarly, for the sensor 46, the amount, y, by which the image of the source 44 is displaced from the x axis is indicative of the amount, Y, by which the source 44 is displaced from the x axis. From simple trigonometry, it is obvious that x relates to the distance, d, between each array 51, 52 and its corresponding light shield 47, 48 as the displacement, X, of the source 44 relates to the distance between the source 44 and the slits 49, 50. Therefore, X, Y can be expressed as in Equations (1) and (2), and through simple algebra, expressions for X and Y can be derived as in equations (6) and (7). Once X and Y are known, simple trigonometry will determine the lag angle, L, and the flap angle, F, by the relationship of X and Y to D, the distance from the pivot point to the source, as illustrated in FIG. 4 and shown in equations (8) and (9).

$$X = (x/d)(R - Y) \quad (1)$$

$$Y = (y/d)(R + X) \quad (2)$$

Substituting (2) into (1):

$$Xd = xR - (x/d)(yR + yX) \quad (3)$$

$$Xd^2 = xRd - xyR - xyX \quad (4)$$

$$X(d^2 + xy) = Rx(d - y) \quad (5)$$

$$X = Rx(d - y)/d^2 + xy \quad (6)$$

$$Y = Ry(d + x)/d^2 + xy \quad (7)$$

$$L = \arcsin(X/D) \quad (8)$$

$$F = \arcsin(Y/D) \quad (9)$$

Figure 5:
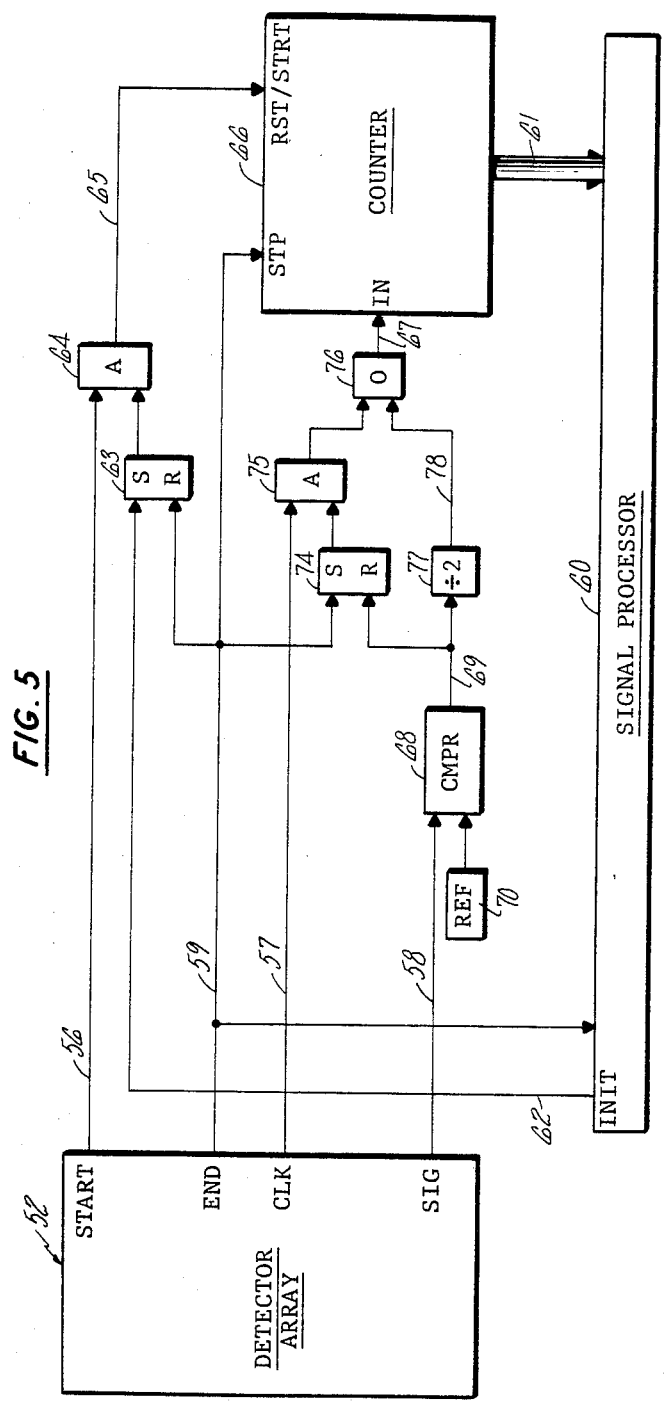
FIG. 5 is an illustration of an exemplary instrumentation circuit for deriving angular information from the detector array of FIG. 3.
Figure 6:
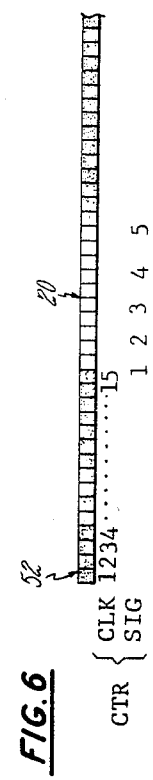
FIG. 6 is a simplified illustration of the optical effect on a detector array and relationships in the circuit of FIG. 5.

In FIG. 5, the detector array 52 is shown connected with simple circuitry to derive the value of x. The RL-1024-G array includes its own scanning circuitry that scans the detectors in sequence, for example, at a rate of about one microsecond per element. It does this repetitively, and begins by providing a start signal on a line 56, and then 1024 clock signals on a line 57, together with a train of output signals on a line 58 indicative of the magnitude of light impinging on successive corresponding elements. Referring to FIG. 6, if the first fifteen elements were dark, the next ten elements were light, and the remaining elements were dark, this would indicate that the center of the image of the source 44 was at element 20. Thus the signal on the line 58 would be of relatively low level for the first fifteen clock pulses, and then be at a relatively high level during the next ten clock pulses, and again return to a low level thereafter. The manner of determining the center of the image is to count clock signals until the light intensity is such that the signal on the line 58 crosses a predetermined threshold, and then to count every other high level signal thereafter until the signal on the line 58 again falls below the threshold. Counting every other clock signal determines the center of the image, as shown in FIG. 5.

In FIG. 5, the detector array 52 is shown as it may be interconnected with counting circuitry for utilization by a signal processor 60, such as a microprocessor or other computer, which through ordinary protocol will tell the circuitry of FIG. 5 when it wants a value of x, receive from the circuit of FIG. 5 an indication when the value is ready, and receive over an input data bus 61 the value of x when it is ready for the processor 60. To indicate that the processor desires a reading of x, it provides an initialization signal on a line 62 which sets a bistable device 63 which will remain set until completion of the scan is indicated by the end signal on a line 59. When set, the bistable device 63 arms an AND gate 64 so that the very next scan, indicated by the start signal on the line 56, will provide a signal through the AND gate 64 on a line 65 to a reset/start input of a counter 66. The counter is then enabled to begin counting, from zero, in response to any signals provided on its input line 67.

Assuming an optical pattern as illustrated in FIG. 6, as scanning begins, the initial fifteen detectors have a relatively low output since the light from the source 44 (FIG. 3) passing through the slit 50 is not impinging thereon. To ensure that the system does not respond to low-level optical signals from ambient light, the signals on the line 58 are fed to a comparator 68 so that a signal will be provided on a line 69 only for signals on the line 58 which exceed a threshold magnitude, as determined by a reference source 70.

A bistable device 74 is initially set at the end of each scan by the end signal on the line 59. It will remain set until a significant signal passes through the comparator 68 onto the line 69. During initial scanning in the pattern of FIG. 6, the bistable 74 will remain set during the first fifteen clock signals on the line 57 so these signals will pass through an AND circuit 75 and an OR circuit 76 to the input line 67 of the counter. The counter will thus count in response to the first fifteen clock signals. When scanning the sixteenth element, the signal on the line 58 exceeds that of the reference 70 so a signal appears on the line 69, resetting the bistable device 74, so that the AND circuit 75 is disarmed and no further clock signals will pass to the counter from the line 57. The signal on the line 69 is also fed to a divide by two circuit 77 (which may comprise a simple flip flop in this case) which in turn will provide a signal on a line 78 in response to every second signal that appears on the line 69. As seen in FIG. 6, with a ten element spread centered at the twentieth element, the divide by two circuit 77 will provide five signals over the line 78 through the OR cirucit 76 to the input line 67 of the counter. Assuming, as in FIG. 6, that very little light is impinging on all of the elements beyond element 30, at the time of the thirty-first clock signal, the signal on the line 58 will be relatively low so the comparator 68 will not provide the signal on the line 69. This will continue for the remainder of the scan. Thus the counter will have counted twenty, indicating the twentieth element as the center of the image of the source 44 on the array 52. When the scan is complete, the end signal on the line 59 will notify the signal processor 60 that the data is available at the counter 66 so the signal processor can access it on its data bus 61. The end signal on the line 59 also resets the bistable device 63, stops the counter 66, and sets the bistable device 74 to establish conditions for the next scanning of the array. The array 51 is also interfaced with the signal processor 60 by similar circuitry (not shown). The signal processor 60 can determine the desired angles in a manner described with respect to Equations (1)–(9) hereinbefore, and further utilize those signals in any way. The nature of processing is extremely straightforward and can be achieved utilizing any of a number of well known techniques.

One advantage of the present invention is that relatively small sensors can track much larger spatial excursions of the blade end. The sensors described in the embodiments herein are only about 3 cm long, but can track blade end movements across a span of 8 or 10 cm in a rotor hub (and much more in an unlimited environment).

The simple embodiment described with respect to FIGS. 3–6 may not be useful in some circumstances. For instance, if pitch angle (33, FIG. 2) is desired, the embodiment of FIGS. 3 and 4 will not provide that information. Furthermore, it may be difficult to find sufficient space to mount the optical source on the center of the blade end 42 (FIGS. 7 and 8).

Figure 9:
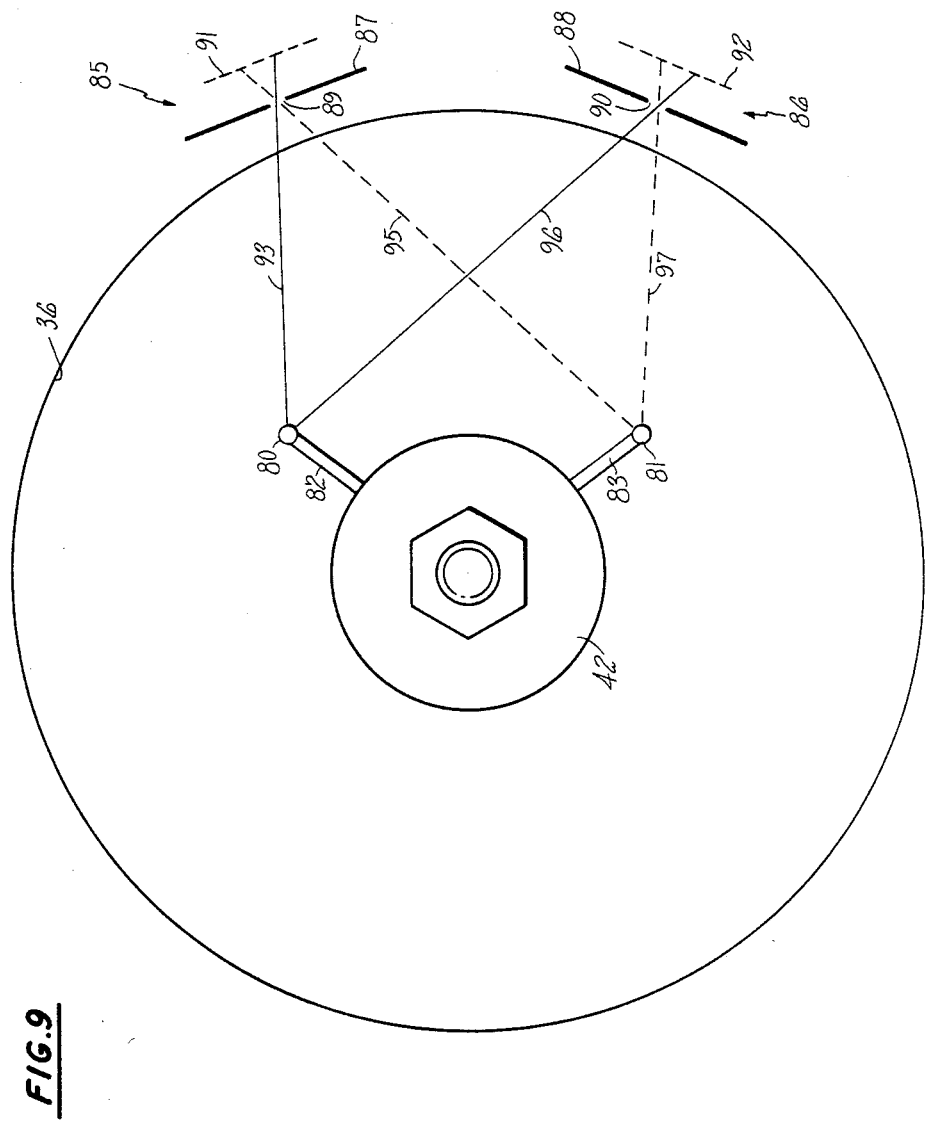
FIG. 9 is a simplified diagrammatic illustration of optical relationships of a sensor system illustrated in FIGS. 7 and 8 while in a neutral position.
Figure 10:
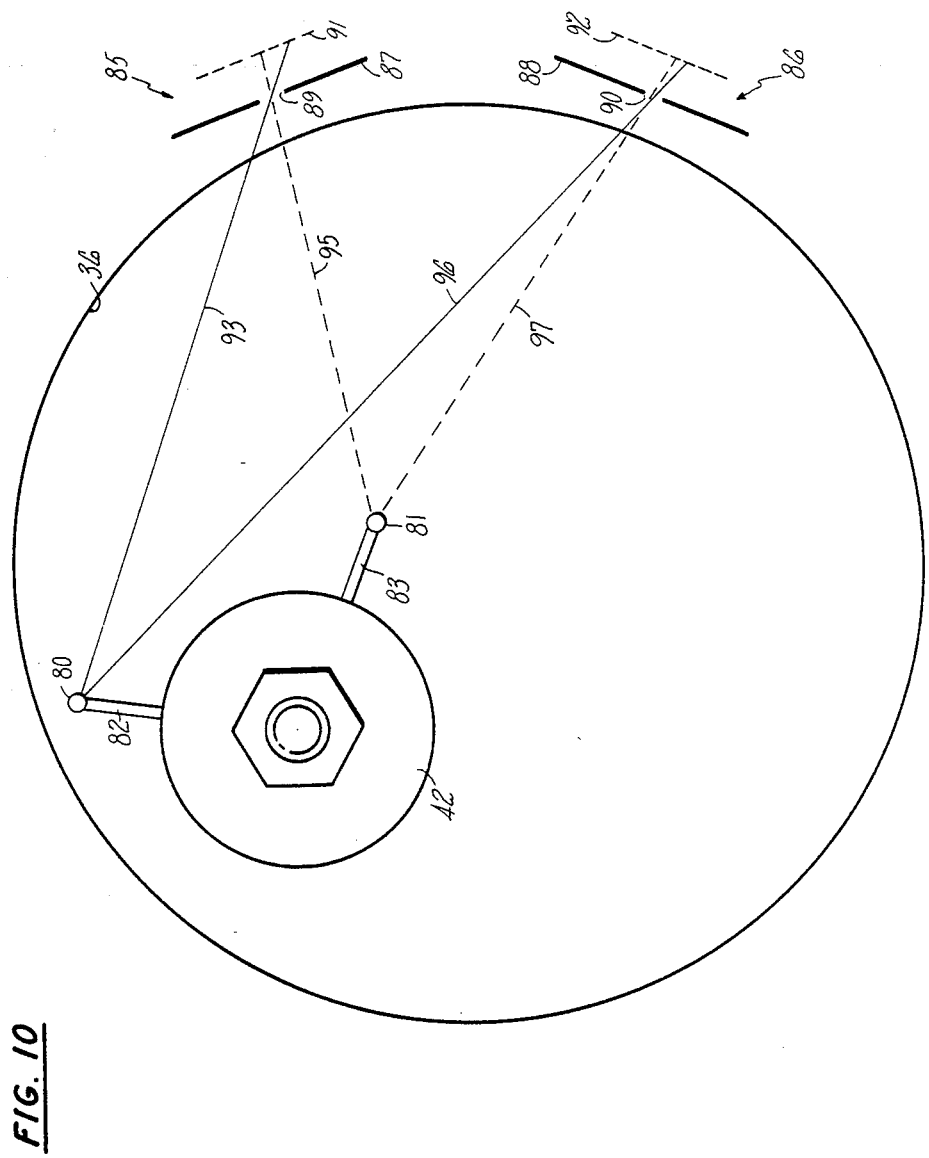
FIG. 10 is a simplfied schematic illustration of optical relationships which obtain in the sensing system of FIGS. 7 and 8 when the rotor blade is concurrently at maximum flap, lag and pitch angles.

A more sophisticated embodiment of the invention is shown schematically in FIG. 7 and 8. A pair of light sources 80, 81 are disposed on arms 82, 83 secured to the blade end 42. A pair of sensors 85, 86 are disposed in the rotor head in a manner so that both sensors 85, 86 are responsive to illumination from both sources 80, 81. This is shown in more detail in FIG. 9 which illustrates the optical situation when the blade end 42 is disposed in a neutral position (assumed in FIG. 9 to be the center of the hub 36, though not necessarily so). Each of the sensors comprises an opaque shield 87, 88 having a slit 89, 90 therein and a detector array 91, 92, of the type described hereinbefore. The image from the source 80 on the detectors 91, illustrated by the solid line 93 appears lower (as seen in FIG. 9) on the array 91 than does the image from the source 81, illustrated by the dotted line 95. Similarly, the image from the source 80, illustrated by solid line 96, appears lower on the array 92 than does the image from the source 81 illustrated by the dotted line 97. Referring to FIG. 10, a worst case condition with maximum lag angle, maximum flap angle and maximum pitch angle is shown. An important aspect of the invention is that the images (93, 96) from the source 80 still appear lower (as viewed in FIG. 10) than do the images (95, 97) from the source 81. This means that the identity of the image, as being that of the source 80 or the source 81, is unambiguous throughout the range of operation of the device. The two-source, two-sensor embodiment of FIGS. 7–10 may employ circuitry similar to that described hereinbefore with respect to FIG. 5, but utilizing one counter for each of the sources in order to uniquely define the center of image of each source.

Figure 11:
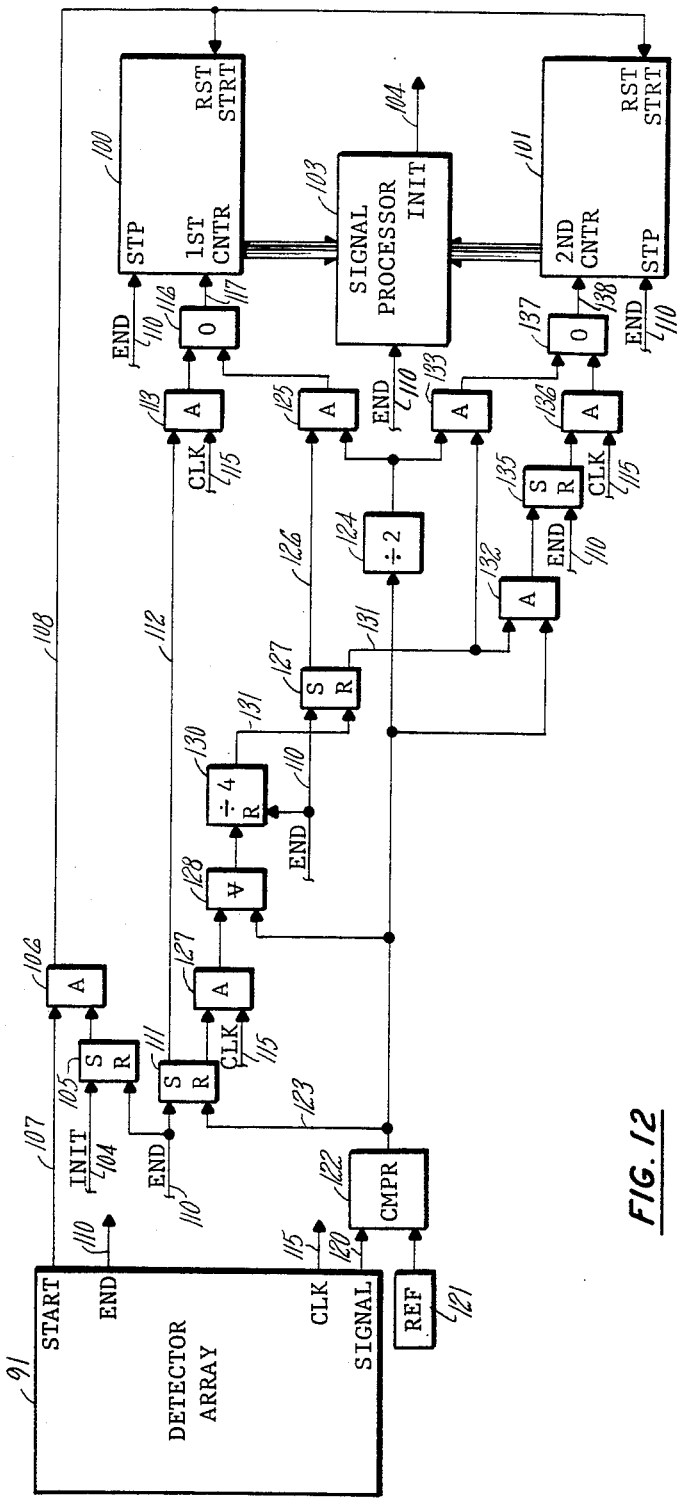
FIG. 11 is a simplified schematic block diagram of signal processing circuitry for deriving information from the sensor array in the system illustrated in FIGS. 7-10.
Figure 12:
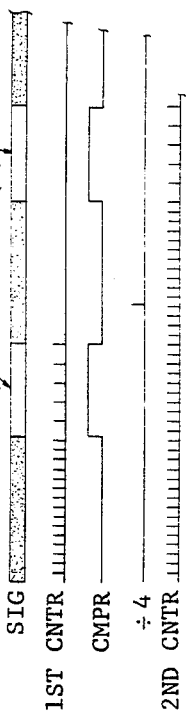
FIG. 12 is a simplfied illustration of signals in the circuitry of FIG. 11.

Referring to FIGS. 11 and 12, a first counter 100 counts clock pulses and signals related to the image 93 of the source 80 on the array 91, and a second counter 101 counts clock pulses and signals relating to the image 95 from the source 81 on the array 91. The manner of operation is that both will initially count clock signals; the first counter 100 will cease counting clock pulses and begin to count every other signal when the signal first exceeds the threshold magnitude, and will cease counting altogether when the signal again reverts below the threshold magnitude; the second counter will count clock signals from the start until the second time that the signal exceeds the threshold magnitude, and will thereafter count every other signal until the signal reverts below the threshold magnitude, after which it ceases to count altogether, as illustrated in FIG. 12. The circuitry of FIG. 11 is illustrated as working with a signal processor 103 which provides an initialize signal on a line 104; this signal will set a bistable device 105 which then arms an AND gate 106 so the very next start signal on a line 107, indicating the start of a scan, will provide a signal through the AND gate 106 on a line 108 which is applied to the counters 100, 101 to reset and start them. At the end of a previous scan, and end signal was applied by the array 91 on a line 110. This has caused a bistable device 111 to be set, thus providing a signal on a line 112 to enable an AND gate 113. As scanning begins, the array 91 provides clock signals on a line 115; these signals will pass through the AND gate 113, and an OR gate 116, to the input line 117 of the counter 100. Successive clock signals will similarly be passed through the AND gate 113 and the OR circuit 116 to the counter 100 until the image 93 from the source 80 is encountered. This will cause a sufficiently high signal output from the array on a line 120 to exceed a threshold established by a reference 121 so that a comparator 122 will provide a signal on a line 123. This signal resets the bistable device 111 so the signal on the line 112 disappears and the AND circuit 113 is thereafter disabled. Thus no further clock signals will be passed through the AND circuit 113 to the counter 100. The signal from the comparator on line 123 will operate a divide-by-two circuit 124 so that every other signal in excess of the threshold magnitude will be presented to an AND circuit 125. The AND circuit is enabled by a signal on a line 126 from a bistable 127 that was put in the set state by the next preceding end signal on the line 110. Thus every other signal from the comparator 122 will pass through the AND circuit 125 and the OR circuit 116 to the input line 117 of the first counter 100, as illustrated in FIG. 12.

The resetting of the bistable device 111 as a consequence of the comparator 123 first sensing a signal in excess of the threshold magnitude, will also enable an AND circuit 127 so that all successive clock signals on the line 115 will pass through the AND circuit 127. These are applied to an exclusive OR circuit 128 which, however, does have a signal at its other input on a line 123 during those portions of the scan corresponding to images on the array, when the signal on the line 120 is in excess of the threshold magnitude. Therefore, the exclusive OR circuit 128 will not provide an output during signals corresponding to the image 93 from the source 80 (FIG. 12). At the end of the image 93, however, there no longer are successive signals on the line 123 so subsequent clock signals will pass through the exclusive OR circuit 128 to a divide-by-four circuit 130. After this circuit counts four clock pulses, it provides a signal on a line 131 to reset the bistable device 127 so the signal on the line 126 disappears and the AND circuit 125 will not thereafter pass signals from the divide by two circuit to the first counter 100. When the bistable 127 is reset, it provides a signal on a line 131 to enable an AND circuit 132 and an AND circuit 133.

At the end of the previous scan, the end signal on the line 110 had reset a bistable device 135 thus enabling an AND circuit 136, so that clock signals on a line 115 are passed through the AND circuit 136 and an OR circuit 137 to the input 138 of the second counter 101. Thus the second counter begins counting clock signals at the start of the scan and will continue to count them until the bistable device 135 is set by a signal from the AND circuit 132. This can only happen after the bistable device 127 is reset (indicating shifting of operating from the first counter to the second counter) and upon encountering the second image 95 by virtue of a signal on the line 123 indicating signals on the line 120 in excess of the threshold magnitude. When the image 95 is encountered, signals appearing on the line 123 are fed to the divide-by-two circuit 124 but also pass through the AND circuit 132 to set the bistable device 135. This disables the AND circuit 136. The AND circuit 133 had previously been armed by resetting of the bistable 127, but no signals appeared on the line 123 so that nothing passed through the AND circuit 133. The first signal of the second image, however, will pass to the divide-by-two circuit and, depending upon the state that it had been left in, that signal may or may not pass therethrough and to the AND circuit 133. Eventually, every other signal is passed through the AND circuit 133 and the OR circuit 137 so as to advance the counter 101, in the manner described hereinbefore. At the end of the second image 95 (FIG. 12) there are no further signals on the line 123 so the count in the second counter 101 remains static thereafter. At the end of the scan, the end signal on a line 110 provides an indication to the signal processor 103 that it can now read out both of the counters 100, 101; the end signal also resets (or sets as the case may be) the controlling bistable devices and the divide by four circuit 130, to put them in a correct condition for the beginning of the next scan. The end signal on the line 110 may also be provided at the stop input of the counters 100, 101 to ensure that switching noise will not provide any additional count therein.

Instead of utilizing the specific circuitry and counters of FIG. 11, the array 91 may be arranged to operate directly with a suitable signal processor, such as a microcomputer, with the counts simply being incremented in suitable storage locations, all in a straightforward fashion. Similar apparatus or direct accommodation with a suitable signal processor of course must be provided for the array 92.

What results in four counts that uniquely define the positions of the images on their respective arrays. Each count uniquely represents an angle to the source. For the source 80, the counts related to the images 93 and 96 define angles of a triangle which includes a known side (a direct line between the slits 89 and 90) from which the other two sides (the actual distances of the images 93, 96 from the source 80 to the slits 89, 90) can be found. Each angle is the arc tangent of the distance of the image along the array from its center divided by the distance from the slit to the array. Similarly, from the two angles, and one known side of the triangle including images 95 and 97, the distances from the arrays 91, 92 to the source 81 can be found. Then through simple trigonometry, the x and y displacements of the sources from their rest positions can be found, and through additional simple trigonometry, the $\bar{x}$ and y displacement of the center can be found. The lag angle is the arc sine of the x coordinate of the center at the current time minus the ratio of the x coordinate of the center at rest to the distance (D) of the pivot point to the source. Similarly, the flap angle is the arc sine of the ratio of the y coordinate of the center at the current time minus the y coordinate of the center at rest to the distance D. When the current x and y coordinates of the sources are known, the current blade pitch angle can be calculated from simple trigonometric relationships of the type described hereinbefore. This data can all be determined with straightforward signal processing related to well known trigonometric relationships.

Figure 13:
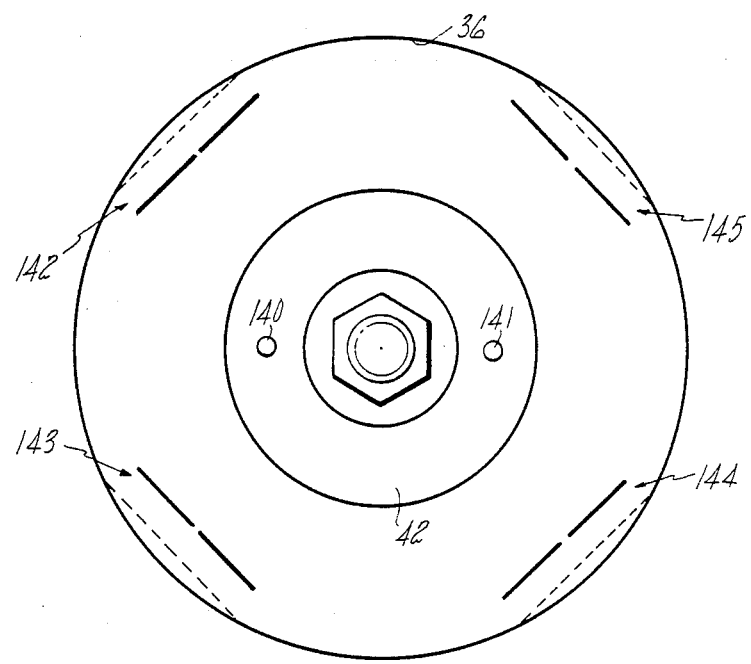
FIG. 13 is a simplified schematic illustration of another embodiment of the invention.

Another embodiment of the invention is illustrated in FIG. 13. Therein, a pair of sources 140, 141 are disposed diametrically on either side of the blade end 42 and four sensors 142-145 are disposed about the blade hub 36. This accommodates the situation where the source cannot be mounted centrally at the blade end (as in the embodiment of FIG. 3, or where pitch angle is desired to be monitored in addition to flap angle and lag angle). The embodiment of FIG. 13 can be operated in several ways. First of all, the relationships described with respect to FIGS. 9-12 can be utilized to separate the image of each source on all four of the sensors, or each source may be operated with only a pair of the sensors by separating their images in a suitable fashion. For instance, the source 140 could have a different optical wavelength than the source 141, and filters could be utilized with the sensors 142, 143 which differ from filters utilized with the sensors 144, 145. Or, the sources and sensors could be so disposed as to ensure that the light from one source (140) enters only related sensors (142, 143) and so forth. Although described with respect to discrete detector arrays, an analog device, equivalent thereto could be used; thus, the term "array" is intended to include such devices.

While the invention has been shown and described with respect to exemplary embodiments thereof, it should be understood by those skilled in the art that various changes, omissions and additions may be made therin and thereto, without departing from the spirit and the scope of the invention.

We claim:

1. An optical system for sensing the position and orientation of a first body with respect to a second body, comprising:
    a pair of optical sources disposed in spaced apart relationship with respect to each other on said first body;
    a pair of optical sensors disposed in spaced apart relationship with respect to each other on said second body, each of said optical sensors including an array of optical detectors and an opaque shield having a slit therein, disposed adjacent the corresponding array between said detectors and said sources, said detectors being disposed with respect to the assumable positions and orientations of said first body such that the light of a first one of said sources provides, through said slits, an image on each of said arrays which is closer to one end of said arrays than the image of the light from the other of said sources on said arrays, for all positions and orientations of said first body, the position of each image on each array being indicative of the angle between such array and the corresponding source; and
    means responsive to the output of said arrays for providing signals indicative of the image position signals thereon, said image positions uniquely defining the position and orientation of said first body.

2. An optical system for determining angles of a main rotor blade disposed on the rotor hub of a helicopter, comprising:
    a light source disposed on the inboard end of a main rotor blade;
    a pair of optical sensors disposed in spaced-apart relationship within the main rotor hub adjacent said inboard end of the blade, each of said sensors comprising an array of optical detectors and an opaque light shield having a slit therein, said shield being disposed on the source side of said array and separated from said array by a distance which is on the order of one tenth the distance between said shield and said source; and
    signal means responsive to said detectors for providing signals indicative of the position on said arrays of light passing from said source through said slits, said signals being indicative of angles of said blade with respect to said hub.

3. A system according to claim 2 including a pair of light sources and wherein said signal means provides signals indicative of blade lag angle, blade flap angle and blade pitch angle.

* * * * *